United States Patent

McGuffey et al.

[11] Patent Number: 5,893,161
[45] Date of Patent: Apr. 6, 1999

[54] METHOD FOR ALLOCATING OWNERSHIP OF PORTIONS OF MEMORY IN A COHERENT MEMORY SYSTEM

[75] Inventors: Ruth McGuffey; David Binford, both of Plano, Tex.

[73] Assignee: Hewlett-Packard Co., Palo Alto, Calif.

[21] Appl. No.: 747,321

[22] Filed: Nov. 12, 1996

[51] Int. Cl.$^6$ .................................................. G06F 12/06
[52] U.S. Cl. ........................................... 711/153; 711/154
[58] Field of Search ..................................... 711/145, 153, 711/141, 142, 147, 154

[56] References Cited

U.S. PATENT DOCUMENTS

| | | | |
|---|---|---|---|
| 4,622,631 | 11/1986 | Frank et al. | 707/201 |
| 4,665,484 | 5/1987 | Nanba | 711/153 |
| 5,265,232 | 11/1993 | Gannon et al. | 711/124 |
| 5,490,261 | 2/1996 | Bean et al. | 711/121 |

*Primary Examiner*—Tod R. Swann
*Assistant Examiner*—Esteban Rockett

[57] ABSTRACT

A method of memory space allocation, performed within a coherent memory of a computer system, for allocating a line of the memory to a device using an ownership-only command, which transfers ownership of the line of memory without transferring the data contained within the line. After receiving the command, the memory then determines if the line was previously allocated to a second device using a conventional read command, the memory sends a flush command to the second device, and retrieves the contents of the line from the second device. After retrieving the contents of the line, or if the second device used the ownership-only command, the memory sends an ownership acknowledgment for the line to the first device, receives replacement data for the line from the first device, and then releases ownership of the line.

8 Claims, 4 Drawing Sheets

METHOD FOR ALLOCATING OWNERSHIP OF PORTIONS OF MEMORY IN A COHERENT MEMORY SYSTEM

FIELD OF THE INVENTION

This invention relates to computer systems and more particularly to memory management within such computer systems. Even more particularly, the invention relates to a method for allocating a portion of memory to a particular device.

BACKGROUND OF THE INVENTION

In large workstation and mainframe computer systems, main memory is often accessed by multiple processors, as well as other devices such as Input/Output devices. All such devices that can modify memory contents will hereafter be called "devices". In this type of system, areas of memory are reserved, or allocated, for example by a device before data is stored into the area of memory. These areas of memory are often called "lines" since they often correspond to a line of cache memory that is attached to one of the processors. Thus, before a device writes to a line of main memory, the device will first reserve, or allocate, the line in main memory.

In the prior art, the device sends a request for ownership along with the address of the line that will be modified. The main memory then reserves, or allocates, the line of memory by assigning ownership of the line to the device requesting ownership. After assigning ownership, main memory sends the data contents of the line to the device that reserved the line. The device then accepts the data, modifies the data, and returns the new data to the main memory, which then stores the data into the line.

This method can be wasteful of bandwidth within the computer system, if the device requesting ownership of a line intends to replace the data contents of the line, regardless of the existing data contents of the line. This occurs, for example, when an I/O device reads data from a peripheral device and stores the data into the line of main memory. Since the I/O device will only write new data, and will discard any existing data contained in the line, it is wasteful of bandwidth to have the existing data from main memory sent to the I/O device, only to be discarded.

Another wasteful situation occurs when the line being requested by a first device has been previously allocated to a second device. When this occurs, the main memory must signal the second device to flush the data back to main memory, so that the first device can gain ownership of the line, and then the data is sent from the main memory to the first device.

There is a need in the art then for a method of reserving a data portion, or line, of main memory without first retrieving the data from the main memory. There is a further need in the art for a system that avoids flushing data when that data is to be overwritten. The present invention meets these and other needs in the art.

SUMMARY OF THE INVENTION

It is an aspect of the present invention to provide a method of allocating a portion of memory to a device.

It is another aspect of the invention to allocate such portion of memory without transferring the contents of the portion to the device.

Still another aspect of the invention is to allocate such portion to a second device without requiring a flush of said portion from the first device.

The above and other aspects of the invention are accomplished in a method wherein an additional memory space allocation command allows a portion of memory to be allocated to a device, without the data contained in the portion being transferred to the device.

The method, performed within a memory of a computer system, allocates a portion, called a line, of memory to a device by first receiving an ownership-only command for allocating the line from a first device, and then determining if the line was previously allocated to a second device. When the line has already been allocated to a second device, the memory sends a flush command to the second device, and then retrieves the data contents of the line from the second device. After retrieving the data contents of the line, the memory sends an ownership acknowledgment for the line to the first device, receives replacement data for the line from the first device, and then releases ownership of the line.

If the second device had also used the ownership-only command, the flush operation is avoided, since the data contents of the line had not been sent to the second device.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
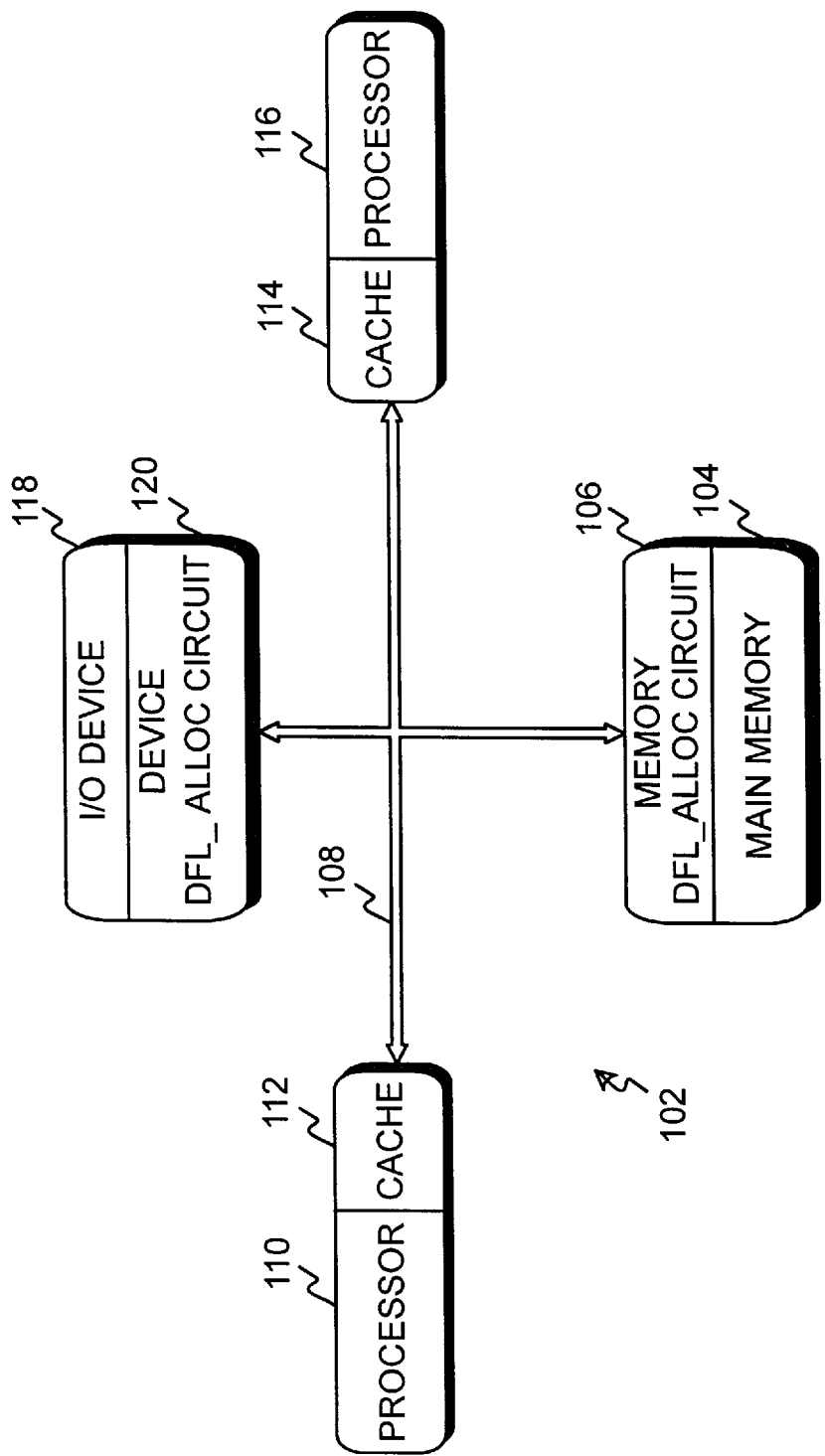
FIG. 1 shows a block diagram of a computer system incorporating the present invention.

FIG. 1 shows a block diagram of a coherent memory computer system incorporating the present invention. Referring to FIG. 1, a computer system 102 contains a main memory 104 and two processors 110 and 116. The computer system 102 also contains an input/output device 118, however those skilled in the art will recognize that a computer system will often have many such I/O devices. Attached to each processor 110 and 116 is a cache 112 and 114 respectively. The cache 112 and 114 are local caches for their respective processors and are used to hold a small amount of data obtained from the main memory 104.

The main memory 104 contains a DFL_ALLOC circuit 106 which performs the methods of the present invention. I/O device 118 also contain a DFL_ALLOC circuit 120 which issues the ownership-only command, called a DFL_ALLOC command, of the present invention over a system bus 108 to the DFL_ALLOC circuit 106 of main memory 104.

In normal practice when an I/O device needs to coherently write to a portion of main memory, typically called a line in main memory, the I/O device requests and obtains private ownership of the line from the memory. The I/O device requests private ownership of the line and identifies the line of memory to which it wants to write. Memory then reserves that line of memory for the I/O device and returns the data contained in the line of memory to the I/O device. The I/O device then writes new data to the line of memory by sending the new data to the memory where it is written into the line.

If, however, the I/O device only intends to write to memory, the I/O device has no need to read the prior data contained in the line, since the I/O device will only replace that data. Thus, the data return from memory is wasteful of system bandwidth when only a write operation is intended.

The present invention comprises a new ownership-only command, called DFL_ALLOC. This command, and its associated protocol, is sent to the main memory by a processor, I/O device, or other type of device, to cause the main memory to reserve a line for use by the device, but the main memory does not send the data contained in the line back to the device. Thus, the DFL_ALLOC command conserves system bandwidth by eliminating the data return of the request for ownership used in the prior art.

Figure 2:
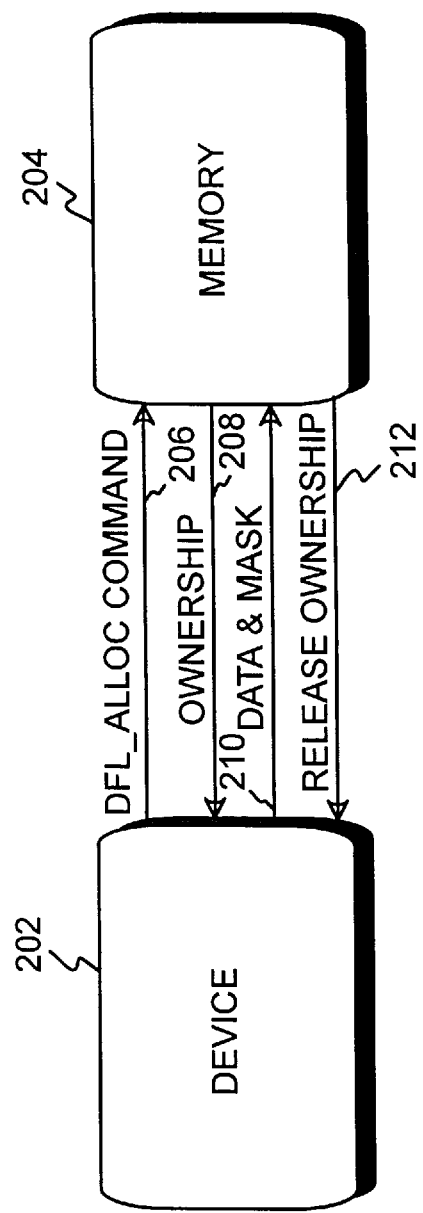
FIG. 2 shows a block diagram illustrating the commands and messages used in the invention for a typical transaction.

FIG. 2 shows a block diagram illustrating the commands and messages used in the invention for a typical transaction with the DFL_ALLOC command. Referring now to FIG. 2, a device 202 requests that a portion of memory 204 be reserved by sending DFL_ALLOC command 206 to the memory 204. In this typical case, the memory line has not been reserved by any other device, therefore, memory 204 returns an ownership indication 208, typically as a separate response to the DFL_ALLOC command, to the device 202. The device 202 then sends data 210 to be stored into the memory line to the memory 204, and the memory 204 responds with a release ownership indication 212 indicating that the line has been released to be available to other devices.

Optionally, when the device 202 sends the data 210 to the memory 204, it can send partial or complete data and also send a replacement specifier, called a mask, indicating which portions of the line within memory are to be overwritten by the partial data. In the present invention, the mask comprises the starting and ending byte numbers of the data being replaced within the line. Alternatively, if the line in memory contains eight words of data, the data sent to the memory might contain only three words, wherein the mask is an eight bit mask with the first three bits each set to a value of one and the last five bits set to a value of zero. The one bits of the mask indicate that the first three words of the line are to be replaced by the three words sent from the I/O device, and the zero bits indicate which words of the line are to remain unaltered.

Figure 3:
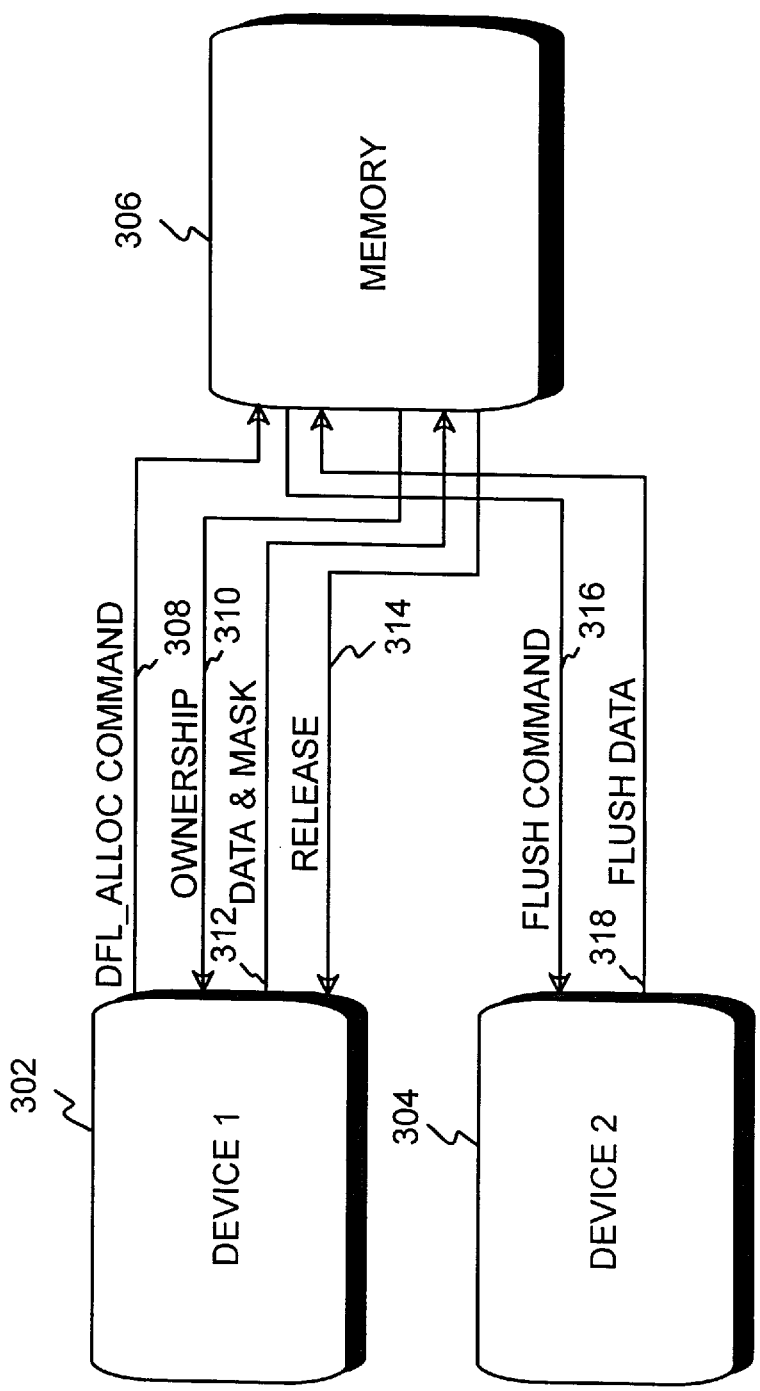
FIG. 3 shows a block diagram illustrating the commands and messages used when a second device already has the portion of memory reserved.

FIG. 3 shows a block diagram illustrating the commands and messages used when a second device had previously allocated a line of memory that a first device now wishes to reserve. Referring to FIG. 3, a first device 302 needs a line of memory contained in a memory 306 so it sends a DFL_ALLOC command 308 to the memory 306. In this example, the line of memory requested by the first device 302 had been previously reserved by a second device 304. Therefore, memory 306 sends a flush command 316 to the device 304 asking it to release the line of memory for use by another device. In response to the flush command 316, the second device 304 flushes data 318 back to memory 306. That is, since the second device 304 already had the line of memory reserved, and assuming for this example it had reserved the line of memory with a conventional request for ownership command, then the second device 304 contained a copy of the data for the line, thus the data contained in the line in main memory was not current. Therefore, that data must be returned to the memory 306 before the line can be reserved for the first device 302.

The memory 306 then sends an ownership command 310 to the first device 302 indicating that the first device now has ownership of the line of memory. Since the first device 302 had requested the line of memory with a DFL_ALLOC command, no data is sent from the memory 306 to the device 302. The first device 302 then sends the data and mask 312 to the memory 306 which updates the line of data in the memory 306, and then memory 306 sends a release command 314 to the first device 302 indicating that it no longer owns the line of data in memory.

Although, in this example, the flush command was needed for the second device 304, since that device had reserved the line of memory with a conventional request for ownership command, bandwidth was saved by not having to send the data back to device 302 because device 302 had requested the data with the DFL_ALLOC command.

Figure 4:
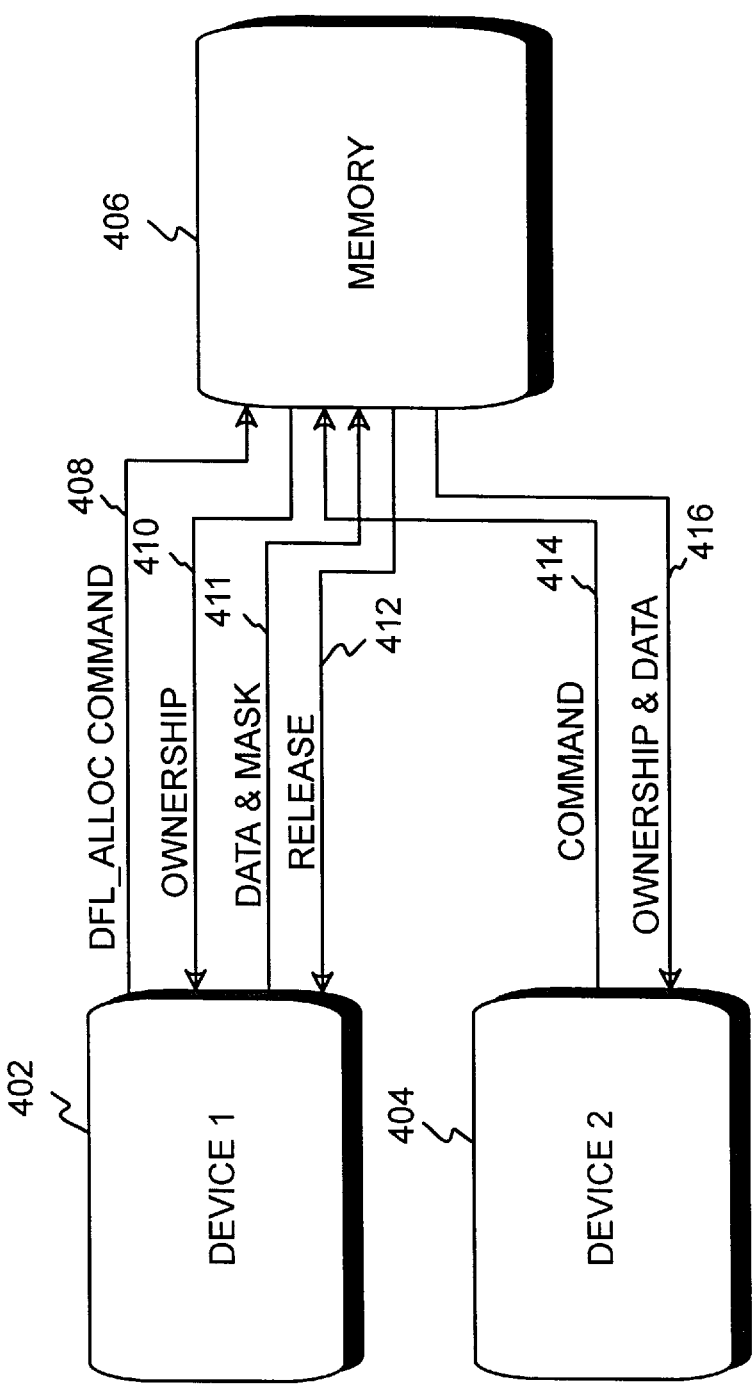
FIG. 4 shows a block diagram illustrating the commands and messages used when a second device requests the portion allocated with the command of the present invention.

FIG. 4 shows a block diagram illustrating the commands and messages used when a second device requests a line of memory that had been previously reserved by a first device using the DFL_ALLOC command of the present invention. Referring to FIG. 4, a first device 402 reserves a line of memory by sending a DFL_ALLOC command 408 to a memory 406. The memory 406 returns an ownership command 410 to the first device 402 indicating that the first device 402 has successfully reserved the line of memory. Before the device 402 has completed its usage of the line of memory that was reserved, a second device 404 sends a conventional request for ownership command 414 attempting to reserve the same line of memory. Because the line of memory was previously reserved with DFL_ALLOC by the first device 402, memory 406 does not send a flush command to device 402. Instead, it waits for device 402 to return its data+mask 411 to memory and then responds to device 404 with the conventional ownership+data 416 and sends the release command 412. Because device 402 had reserved the line with a DFL_ALLOC command, there is no need to ask device 402 to flush the data back to memory 406, since the protocol of the DFL_ALLOC command prevented any data being sent to the first device 402.

In this example, because of the use of the DFL_ALLOC command, a complete flush cycle from memory 406 to the first device 402, as well as the flush response, was avoided, thus saving bandwidth over the system bus. In addition, since the first device 402 used the DFL_ALLOC command, additional bandwidth was saved since no data needed to be sent to the device 402. Thus, in this example, considerable bandwidth has been saved over the system bus.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A method, performed within a memory of a computer system, for allocating a portion of said memory to a device, said method comprising the steps of:

(a) receiving an ownership-only command for allocating a portion of said memory from a first device prior to writing data into said portion of said memory;

(b) sending an ownership acknowledgment of said portion to said first device, without sending data contained in said portion to said first device;

(c) receiving replacement data for said portion from said first device; and (d) sending a release of ownership for said portion to said first device.

2. The method of claim 1, wherein step (a) further comprises the following steps performed after step (a) and before step (b):

(a1) determining if said portion was previously allocated to a second device;

(a2) when step (a1) determines that said portion has been previously allocated to a second device, sending a flush command for said portion to said second device; and (a3) when step (a2) sends said flush command to said second device, receiving a contents of said portion of memory from said second device.

3. The method of claim 1, wherein step (a) further comprises the following steps performed after step (a) and before step (b):

(a1) determining if said portion was previously allocated to a second device, and was allocated with an ownership-only command;

(a2) when step (a1) determines that said portion was not previously allocated to a second device with an ownership-only command, sending a flush command for said portion to said second device;

(a3) when step (a2) sends said flush command to said second device, receiving a contents of said portion of memory from said second device.

4. The method of claim 1 wherein step (c) further comprises the steps of:

(c1) receiving partial replacement data for said portion from said first device, and further receiving a replacement specifier defining which parts of said portion are to be replaced by said partial replacement data; and (c2) replacing data in said portion with said partial replacement data, as defined by a mask.

5. A method, performed within a memory of a computer system, for allocating a portion of said memory to a device, said method comprising the steps of:

(a) receiving an ownership-only command for allocating a portion of said memory from a first device prior to writing data into said portion of said memory;

(b) determining if said portion was previously allocated to a second device;

(c) when step (b) determines that said portion has been previously allocated to a second device, sending a flush command for said portion to said second device;

(d) when step (c) sends said flush command to said second device, receiving a contents of said portion of memory from said second device;

(e) sending an ownership acknowledgment of said portion to said first device;

(f) receiving replacement data for said portion from said first device; and (g) sending a release ownership acknowledgment for said portion to said first device.

6. The method of claim 5 wherein step (f) further comprises the steps of:

(f1) receiving partial replacement data for said portion from said first device, and further receiving a mask defining which parts of said portion are to be replaced by said partial replacement data; and (f2) replacing data in said portion with said partial replacement data, as defined by a mask.

7. A method, performed within a memory of a computer system, for allocating a portion of said memory to a device, said method comprising the steps of:

(a) receiving an ownership-only command for allocating a portion of said memory from a first device prior to writing data into said portion of said memory;

(b) determining if said portion was previously allocated to a second device, and was allocated with an ownership-only command;

(c) when step (b) determines that said portion was not previously allocated to a second device with an ownership-only command, sending a flush command for said portion to said second device;

(d) when step (c) sends said flush command to said second device, receiving a contents of said portion of memory from said second device;

(e) sending an ownership acknowledgment of said portion to said first device;

(f) receiving replacement data for said portion from said first device; and (g) sending a release of ownership for said portion to said first device.

8. The method of claim 7 wherein step (f) further comprises the steps of:

(f1) receiving partial replacement data for said portion from said first device, and further receiving a mask defining which parts of said portion are to be replaced by said partial replacement data; and (f2) replacing data in said portion with said partial replacement data, as defined by a mask.

* * * * *